United States Patent [19]

Albertson et al.

[11] Patent Number: 6,095,739

[45] Date of Patent: Aug. 1, 2000

[54] CATEGORIZING FASTENERS AND CONSTRUCTION CONNECTORS USING VISUAL IDENTIFIERS

[76] Inventors: Stephen H. Albertson, 24941 Calle Vecindad, Lake Forest, Calif. 92630; John C. Gallagher, 300 N. Kathryn, Anaheim, Calif. 92801; Vlasta A. Albertson, 24941 Calle Vecindad, Lake Forest, Calif. 92630

[21] Appl. No.: 09/109,598

[22] Filed: Jul. 2, 1998

Related U.S. Application Data

[60] Provisional application No. 60/051,652, Jul. 3, 1997.

[51] Int. Cl.$^7$ .............................. F16B 15/00; F16B 19/00
[52] U.S. Cl. ............................. 411/439; 411/13; 411/377; 411/903
[58] Field of Search ................................ 411/13, 14, 377, 411/439, 411, 923, 908, 372.5, 903

[56] References Cited

U.S. PATENT DOCUMENTS

| | | |
|---|---|---|
| 3,076,373 | 2/1963 | Matthews . |
| 3,252,569 | 5/1966 | Matthews . |
| 3,550,244 | 12/1970 | Villo et al. . |
| 3,693,495 | 9/1972 | Wagne ..................................... 411/377 |
| 3,894,466 | 7/1975 | Wibrow . |
| 4,074,011 | 2/1978 | Teramae et al. . |
| 4,165,242 | 8/1979 | Kelly et al. . |
| 4,995,274 | 2/1991 | Kleeman ............................... 411/13 X |
| 5,165,831 | 11/1992 | Yager et al. . |
| 5,511,917 | 4/1996 | Dickson . |
| 5,564,876 | 10/1996 | Lat . |

FOREIGN PATENT DOCUMENTS

| | | |
|---|---|---|
| L 13547 | 5/1956 | Germany . |
| 0.486.300 | 1/1955 | Italy . |

*Primary Examiner*—Neill Wilson
*Attorney, Agent, or Firm*—Knobbe, Martens, Olson & Bear LLP

[57] ABSTRACT

A method of categorizing fasteners and construction connectors by size and type using a color coding system. Each fastener receives a designated and distinct color contained on the surface that is exposed before and after installation. The colors are preselected to define one or more physical properties of the fasteners. A color key is provided to determine the physical properties of the fasteners based on the coloring of exposed portions of the inserted fasteners. Similarly, construction connectors receive a designated and distinct color contained on the surface that is exposed before and after installation. The color represented on the surface of the construction connector is such that the corresponding fastener is the same color.

11 Claims, 10 Drawing Sheets

CATEGORIZING FASTENERS AND CONSTRUCTION CONNECTORS USING VISUAL IDENTIFIERS

CROSS REFERENCE TO RELATED APPLICATION

The present application claims priority under 35 U.S.C. § 119(e)(1) to the provisional application entitled CATEGORIZING FASTENERS AND CONSTRUCTION CONNECTORS USING VISUAL IDENTIFIERS which was filed on Jul. 3, 1997 and assigned application Ser. No. 60/051,652.

FIELD OF THE INVENTION

The present invention relates to a color coding system to identify the physical properties of fasteners and connectors both before and after their application.

BACKGROUND OF THE INVENTION

Modem building codes strictly control the types of materials and methods which may be used in building construction. These codes are primarily enacted to ensure that the resulting structures are safe. Failure to comply with the codes often results in the structure not being approved for habitation, and could expose the builder or developer to liability to the buyer. Furthermore, noncompliance results in delays in construction, and increased production costs, due to the time and expense of correcting the mistakes.

In the past few years, the construction industry has gone through major changes. Structures have become more complex, construction schedules are tighter, the labor force generally has no formal training, and there are often language barriers which make it difficult for the labor force to fully understand instructions. Consequently, it has become increasingly difficult to build structures in full compliance with the governing building codes.

The task of ultimately determining whether a structure has been built to code is generally assigned to building inspectors, structural engineers and superintendents. These individuals review a construction site for compliance with architectural blue prints and Uniform Building Codes. The purpose of this inspection is to ensure the safety of the structure by checking that the proper materials/fasteners/construction connectors have been used and in the correct manner.

During the planning of a construction project, the architect will specify certain fasteners and construction connectors based upon their appropriateness to achieve the function they are to perform, and the applicable building codes which govern that type of use. Furthermore, different materials require that different fasteners be applied at specific spacings based on calculations made by the engineers and architect. After these fasteners have been incorporated into the structure by the builder, it is next to impossible for the inspector to know the precise characteristics of the fastener. This is because the portions of the fastener which remain exposed, such as the head of a nail, do not indicate the physical properties of the fastener which may be required by the codes or architect, such as its diameter (or gauge), length, weight, etc. Short of having the fastener removed for inspection, there is often no way to determine this. This problem also exists when verifying that the proper fastener has been used in combination with the proper construction connector, such as plate straps. Consequently, building inspections are more time consuming and costly. There is also increased risk of error, and thus corresponding risk to safety, as the inspector may inadvertently overlook improper fastener or connector uses.

Prior attempts to solve this problem have been unsuccessful. For example, one such attempt is described in U.S. Pat. No. 5,511,917 issued to Charles F. Dickson, the entirety of which is incorporated by reference as if fully set forth herein. The Dickson patent describes a complex system in which numbers and clock like markings are inscribed into nail heads. The markings represent a pattern from which the length and/or gauge of the nail can be identified. However, because the size of the markings is limited by the size of the nail head, for very small nails, the markings cannot be distinguished unless one is within a close proximity (12" maximum) to the nail due to the small size of the inscription. This limits the usefulness of such a marking system, because it would be difficult for building inspectors to determine accurate fastener use from a distance. Further, the Dickson patent states that the nail must be inserted in a specific orientation for the markings to be usable, or that an even more complex marking system providing orientation must be used. Clearly, such complex indicators do not provide the simplification needed by industry and inspectors. Furthermore, the markings taught by Dickson would be distorted by the impact of the driving tool/system, likely making the markings illegible. This system for inscribing distinguishing marks on the nail heads has not been widely adopted, if at all.

Consequently, there exists a need for fasteners and connectors with readily identifiable indicators to determine their physical properties after they have been inserted. Furthermore, there exists a need for an efficient and easy method of determining the physical properties of fasteners after the fasteners have been used.

SUMMARY OF THE INVENTION

The present invention provides a color coding system, which may be used in conjunction with a lettering or symbol system, for identifying construction fasteners and any corresponding construction connector by size and type, both before and after application. Advantageously, the system of the present invention provides for more efficient identification, both in terms of increasing the accuracy of determining if the correct fastener or connector has been used, and in decreasing the time required to make such determinations.

The present invention can be used to color code all possible types of fasteners and any corresponding construction connectors to designate their physical properties. These properties include, length, shaft length, leg length, shaft diameter (or gauge), width, crown width, thickness, weight, threads, threads per unit of measure, tip configuration, anchoring capabilities, composition, materials, substance treatment, variations in surface, or any other physical property of a fastener which can be determined.

In the present invention, a different color is pre-selected to define a fastener property and is assigned to each of the most common (but not limited to) fasteners. After application of the color to the fastener, the color can be used to distinguish the physical and other characteristics of fasteners and thereby their intended use. The colors are chosen to best contrast with the background materials most common to the fasteners. The colors are also applied so that they may be determined from a distance after the fastener has been installed. The colors which may be used include those from the visible light spectrum, neon colors, fluorescent colors, and marking materials that fade over time if there is an instance when the color would distract from the finished structure. Moreover, two or more colors may be used on one fastener to connote different types of information such as one color identifying the composition of the fastener and another color its length, or other variations of the physical properties of the fastener. Letter designations corresponding to the fastener composition may also be added on top of color coding for further identification (e.g., G representing galvanized, R representing ring shank, V representing vinyl, and so on). Other types of symbols may also be used besides lettering to categorize the fasteners and connectors.

A color code key, preferably in card or chart form, may then be provided which categorizes the physical properties of the fasteners by color. Architects and building planners may incorporate these colors directly into their blueprints or building specifications. If the construction site is provided with fasteners and connectors incorporating the pre-selected color scheme, workers using the fasteners and connectors of the present invention are more likely to select the correct fastener or connector for an intended application because they will be able to confirm the choice by comparing the color to that on the blueprints. Furthermore, a building inspector will be able to more quickly and accurately determine if correct fasteners and connectors have been used when the present invention is incorporated into a construction site, by simple color observation.

Another benefit of the present invention is that the color coding system is also applicable to construction connectors that are used in conjunction with fasteners. Color coding the construction connector and the fasteners will make it readily apparent if the proper combination has been used. This is done by matching the proper fastener to the proper construction connector by marking a piece of the connector (e.g., hardware or strap) with an identifying color corresponding to the correct fastener. Further, when both the fastener and corresponding connector have been color coded in this manner, an inspector can stand at a distance and assess if the correct fastener (nail for example) was used with the connector because of the color(s) distinction. This will make the use and inspection of such construction connector/fastener applications visually identifiable.

In one aspect of the present invention, there is provided a fastener comprising a shaft having a first end and a second end. An exposed portion is attached to the first end of the shaft, and an identifying color is on the exposed portion. The identifying color is pre-selected to correspond to at least one physical property of the fastener and is capable of being recognized by a person of normal vision from a distance of at least 10 feet, and more preferably from a distance of at least 18 feet, when the shaft has been fully inserted into a surface. In one embodiment, there is a second identifier on the exposed portion, the second identifier corresponding to at least a second specified physical property of the fastener. The second identifier may be a second color in addition to the first, such as red stripe or marking on a blue background, and/or the second identifier may be a letter or symbol.

In another aspect of the present invention, there is provided a method of identifying physical properties of inserted fasteners from a distance. The method comprises applying a colored coating over the surface of an exposed portion of the fastener prior to using the fastener. The colored coating has been pre-selected to correspond to at least one physical property of the fastener. Then, the fastener is inserted so that the coloring on the exposed portion remains visible and may be determined by a person of normal vision from a distance. Preferably, the color of the exposed portion may be determined from a distance of at least 15 feet, and more preferably from a distance of at least 18 feet.

In another aspect of the present invention, there is provided a method of identifying fastener physical properties during building inspection. The method comprises selecting a plurality of colors to apply to an exposed surface of a fastener. Each color of the plurality specifically connotes one or more properties of the fastener. One of the plurality of colors is applied to the exposed surface of the fastener having the properties that the color connotes, so that the color may be recognized by a person of normal vision from a distance of at least 18 feet. Then, the fastener is inserted into an object. A building inspector provided with a color key indicating the physical properties that each selected color connotes, will be able to readily determine the physical properties of the inserted fasteners, such as their length, gauge, or composition.

In another aspect of the present invention, there is provided a construction joint comprising a first surface and a second surface. The first and second surfaces are subject to a regulation which requires specified physical properties for fasteners used to join the first and second surfaces. A fastener is used to secure the first surface to the second surface. The fastener has a colored portion which is exposed to view. The color of the colored portion has been pre-selected to define one or more physical properties of the fastener which correlate to those set forth in the regulation. The joint may be formed from two wood surfaces, two metal surface, two plastic surfaces, or any combination of these and other common construction materials.

In another aspect of the present invention, there is provided a method of making a fastener with physical properties which are identifiable from a distance. The method comprises pre-selecting a plurality of colors where each color corresponds to at least one specified physical property of a fastener. Then a fastener having a known physical property is provided. A specified color of the plurality is then applied to the fastener so that the specified color may be determined from a distance, with the specified color having been pre-selected to define the known physical property of the fastener.

In another aspect of the present invention, there is provided a fastener and connector system. The system comprises a connector which is required by regulation to be used with fasteners having specified properties. A first colored coating is on the connector, the first coating color having been pre-selected to indicate the fasteners which regulation permits may be used with the connector. The system also includes a fastener having the specified properties. A second colored coating is on the fastener, the second coating color having been pre-selected to define the specified physical properties of the fastener.

BRIEF DESCRIPTION OF THE DRAWINGS

The accompanying drawings, which are incorporated in and form part of the specification, illustrate embodiments of the invention and, together with the description, serve to explain the principles of the invention.

DETAILED DESCRIPTION OF THE PREFERRED EMBODIMENT

Figure 1A:
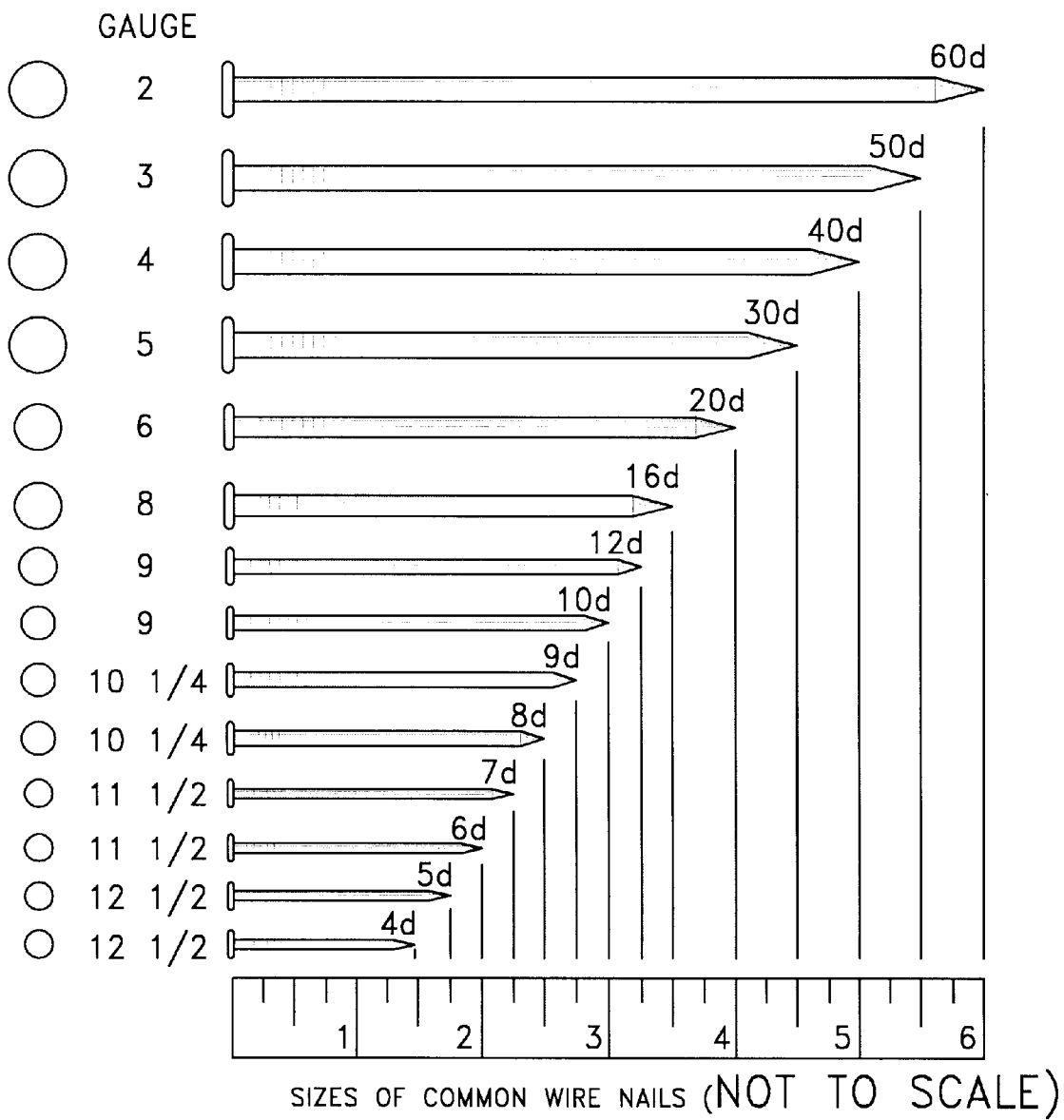
FIG. 1A shows a chart indicating sizes of common wire nails.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The focus of the entire construction industry is quality control. The architectural blueprints define the materials that must be used in the structure, and the appropriate materials/fasteners/connectors to use to comply with building codes. Consequently, everything must be built as the blueprints specify. When this is done, the resulting structure will be safer, and the builder will not incur additional expenses to bring the structure to code, or as a result of liability claims. As described herein, the present invention will benefit the construction industry with respect to fastener incorporation, by reducing human error, increasing accuracy, saving time, increasing consistency, and simplifying application. Further, the benefit to the builder, installer, inspector, and finally the consumer is a more efficient method of adhering to the engineers/architects specifications and the Uniform Building Codes. This will result in the building of safer structures, to the benefit of all.

Builders are under increased pressure to build structures in full compliance with applicable building codes. For example, building departments now commonly require that the structural engineer who created the blueprints submit a signed letter stating that he has inspected the structure and all the hardware/fasteners have been installed per his drawings. Nevertheless, building inspectors must still visually confirm the installation of all straps, anchor bolts, connecting hardware, and nailing schedules, and other fasteners. For example, the plywood panels of the structure must be nailed with specific size nails and nail spacing (refereed to in the building schedules). The size/spacing varies with the engineer's requirements. This is critical to the structure and is checked very carefully, consuming many hours of time. Further, when these panels are on the second and third floors it is very difficult to see the heads of these nails, and it is impossible to verify the size/gauge/type, etc.

The inspection process consists of inspecting: the floor sheeting for anchor bolts, nailing of plywood, connection to slab, nailing of floor joist to wall, all structural hold downs and hardware; the roof sheeting for spacing of all nails on roof plywood as designed by engineer; the sheering for the action or force causing two contacting parts or layers to slide upon each other, moving apart in opposite directions parallel to the plane of their contact (walls that prevent the structure from moving laterally), and inspect all uplift and hold downs; and the drywall and lathing to determine that all nailing occurred per schedule designed by engineer. An example of a Building Code setting forth these requirements is the Uniform Building Code, published by the International Conference of Building Officials, ISSN 0896-9728, the entirety of which is incorporated herein by reference as if fully set forth herein. The Uniform Building Code has been widely adopted by regulatory authority for home construction.

The present invention makes the inspection process simpler and quicker, by providing a color coding system, which may be used in conjunction with a lettering system, for identifying the physical properties of construction fasteners and any corresponding construction connectors before and after their insertion. Such color coding may be applied to all possible types of fasteners and their corresponding construction connectors to designate the specifics of their physical or application properties. These physical properties include, but are not limited to, length, shaft length, leg length, shaft diameter (or gauge), width, crown width, thickness, weight, threads, threads per unit of measure, tip configuration, anchoring capabilities, composition, materials, substance treatment, and variations in surface. Application properties may include the type of fastener or its intended use, as for example a wood nail, concrete nail, or roofing nail. These properties may be identified, where appropriate, for any type of fastener, including nails, bolts, screws, anchor bolts, nuts, bolts, rivets, staples, wedge anchor bolt, straps, stir-stirrups, hangers, tie plates, and other types of fasteners as known to those of skill in the art.

As used herein, the term fastener refers to any of the variety of devices which are used to attach one surface to another surface during a construction process. Moreover, fasteners as referred to in the present invention may be used in the construction of homes, commercial buildings, airplanes, automobiles, machines, or any other articles of manufacture. The present invention is most useful, however, when correct selection of an appropriate fastener prior to application is particularly important, or when it is important to determine a physical property of a fastener once the fastener has been used in its intended environment, as for example on building inspection. Thus, it is preferred that fasteners of the present invention possess an exposed portion or exposed surface which may be seen after the fastener has been installed or inserted, and to which the color coding may be applied.

Referring now to the drawings, FIG. 1A is a diagram of conventional wire nails know to those of skill in the art, showing the physical properties of length and gauge of the nails. These types of nails are a common fastener used in the home and commercial construction industry. The nails are various lengths and gauges, and a builder or architect selects the appropriate length and gauge depending on the particular joint, wall, or other surface to be fastened. There are no distinguishing features on any of the fasteners shown to identify their properties, and this represents the current conditions in which nail fasteners are made. Once the fasteners in FIG. 1A have been applied by being hammered into a surface, the length and gauge of nail fastener can not be identified, because the shaft of the nail will be inserted into a surface, thereby obscuring these properties from view.

Figure 1B:
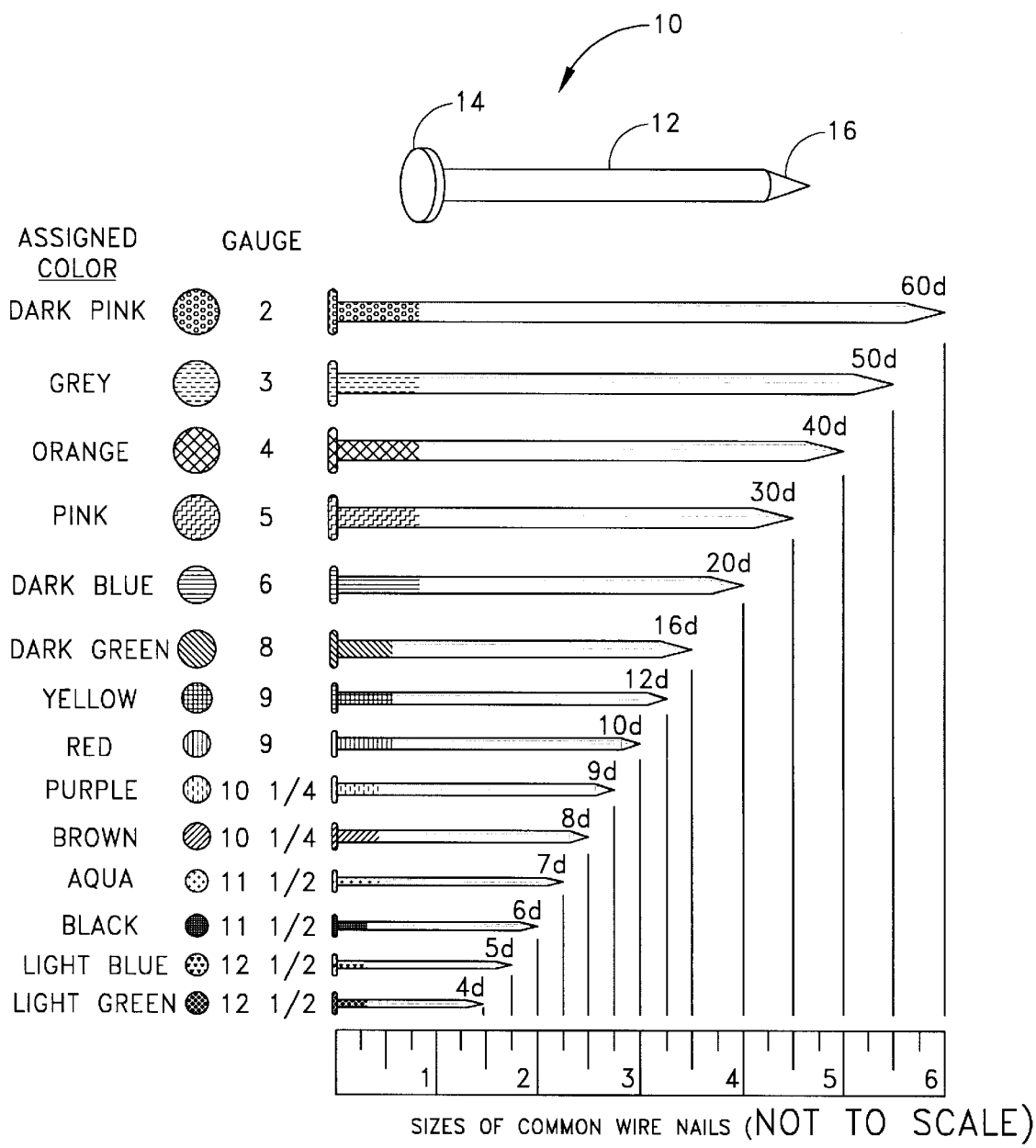
FIG. 1B shows a chart indicating sizes of common wire nails which have been color coded according to the present invention.

Referring to FIG. 1B, there are shown wire nails which feature the color coding system of the present invention. Nail 10 is representative of the nails depicted in profile in FIG. 1B, and has a shaft 12, which terminates in tip 16 and is connected to head 14. Head 14 provides the exposed portion upon which the color coding of the present invention will be applied. As shown in FIG. 1B, each of the fourteen nails has been assigned a different preselected color which defines its type (wire), length and gauge. The coloring has been applied to an exposed portion of the fastener, in this case the head of the nails. It should be readily understood by those of skill in the art that the specific colors set forth in FIG. 1B are merely a representative application of the present invention, and that other colors may be substituted or chosen. However, the benefits of the present invention will be greatest if a uniform set of colors is adopted by industry and the same set of colors identifying the same physical properties for the fastener of interest is used by all.

As can be readily appreciated, the nails depicted in FIG. 1B which incorporate the present invention can be readily distinguished both before and after they are inserted. For example, a construction worker reading a blueprint specifying that he must use a 9-gauge nail having a three-inch length (a 9d nail) could confirm that the correct nail was selected and used if the present invention were applied as shown in FIG. 1B and a nail having a red coloring on its head was chosen. More preferably, accuracy will be increased further when the architectural blueprints which the construction worker follows incorporate the color coding system of the present invention to specify correct fastener usage. If such were the case, the construction worker could observe that red-colored nail fasteners (9d nails as in FIG. 1B) need to be used for a certain application by viewing the blueprints, and make the correct choice by following the color scheme set forth in the blueprints. Similarly, once the nail has been used, and the shaft sunk deeply into a wood surface, a building inspector could determine that the nail is a 9-gauge three-inch nail by being provided with a color key correlating nail properties to color as described in FIG. 1B, and observing the red color on the head of the nail.

Figure 1C:
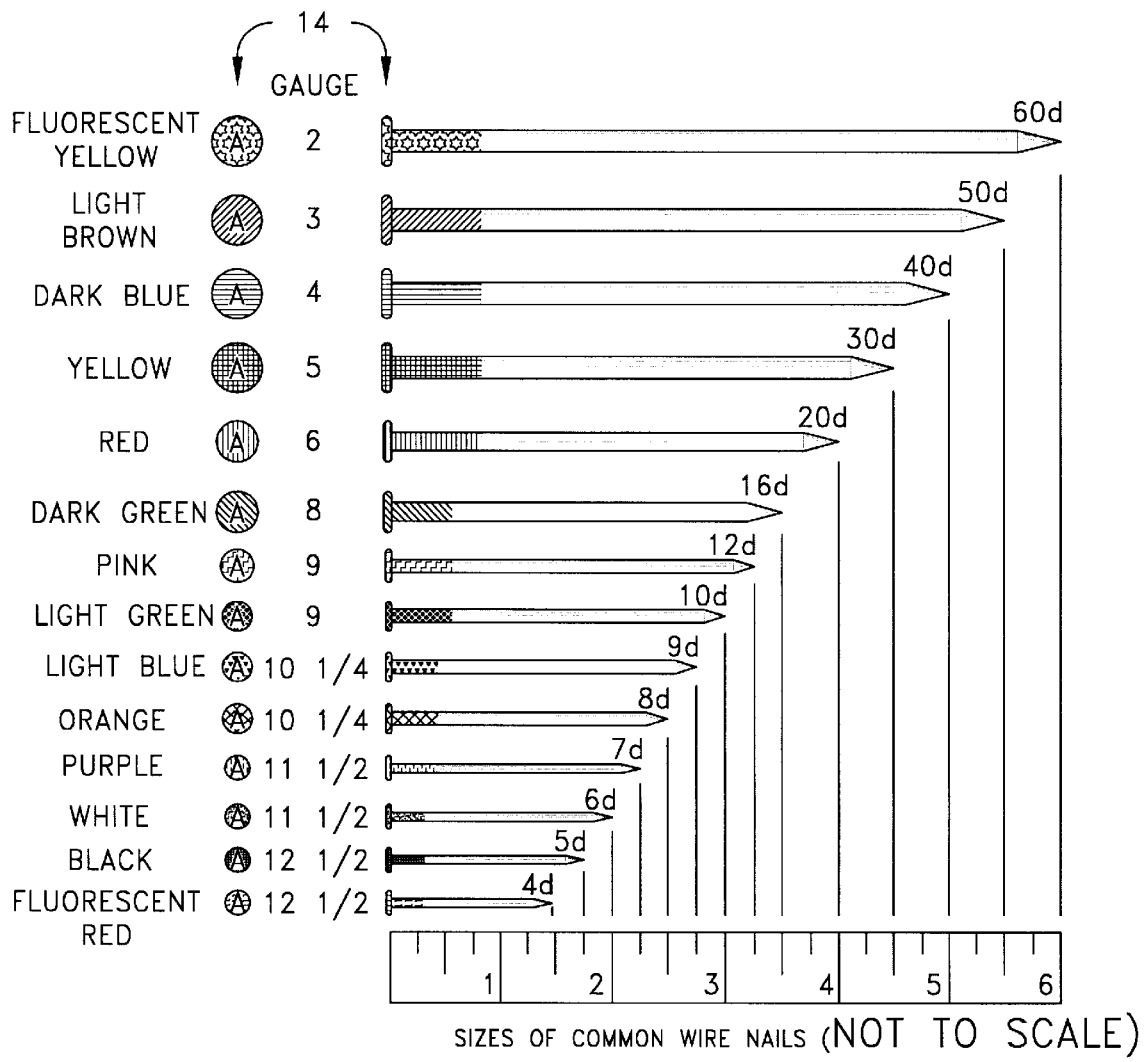
FIG. 1C shows a chart indicating sizes of common wire nails with color coding in conjunction with alphabetic letter.

Referring to FIG. 1C, there is shown another embodiment of the present invention, in which a letter designation has been used in conjunction with the color coding on the nail fasteners. The colors assigned to define type, length and gauge for the nail fasteners depicted in FIG. 1C are different than those of FIG. 1B, to illustrate the variety of pre-selected colors that may be used in the present invention. The color and lettering depicted in FIG. 1C is applied to exposed portion 14, which corresponds to the surface of the nail head. The lettering can be used to further distinguish technically specific variations of the nail fasteners within each color category. For example, "G" indicating galvanized (rust resistant), "R" indicating ring shanked (barbed shaft), and so on. Furthermore, other symbols may be used in place of letters to allow for further identification. For example, geometric symbols might be used, such as squares, circles, triangles etc. Alternately, numbers, hash markings, or texture (depressions or raised portions) might be used, or any combination of the foregoing.

Although FIG. 1A, FIG. 1B and FIG. 1C show a nail as the specific fastener to which the present invention is applied, it is understood that the present invention, as described above, can be used for other fasteners such as screws, anchor bolts, nuts, bolts, rivets, staples, wedge anchor bolt, straps, stir-stirrups, hangers, tie plates, and other types of fasteners as known to those of skill in the art. For these other types of fasteners, the teachings of the present invention with respect to nails can be directly incorporated. That is, an exposed portion of one of these fasteners can be color coded to identify one or more specific properties of the fastener, such as length or diameter.

Figure 2:
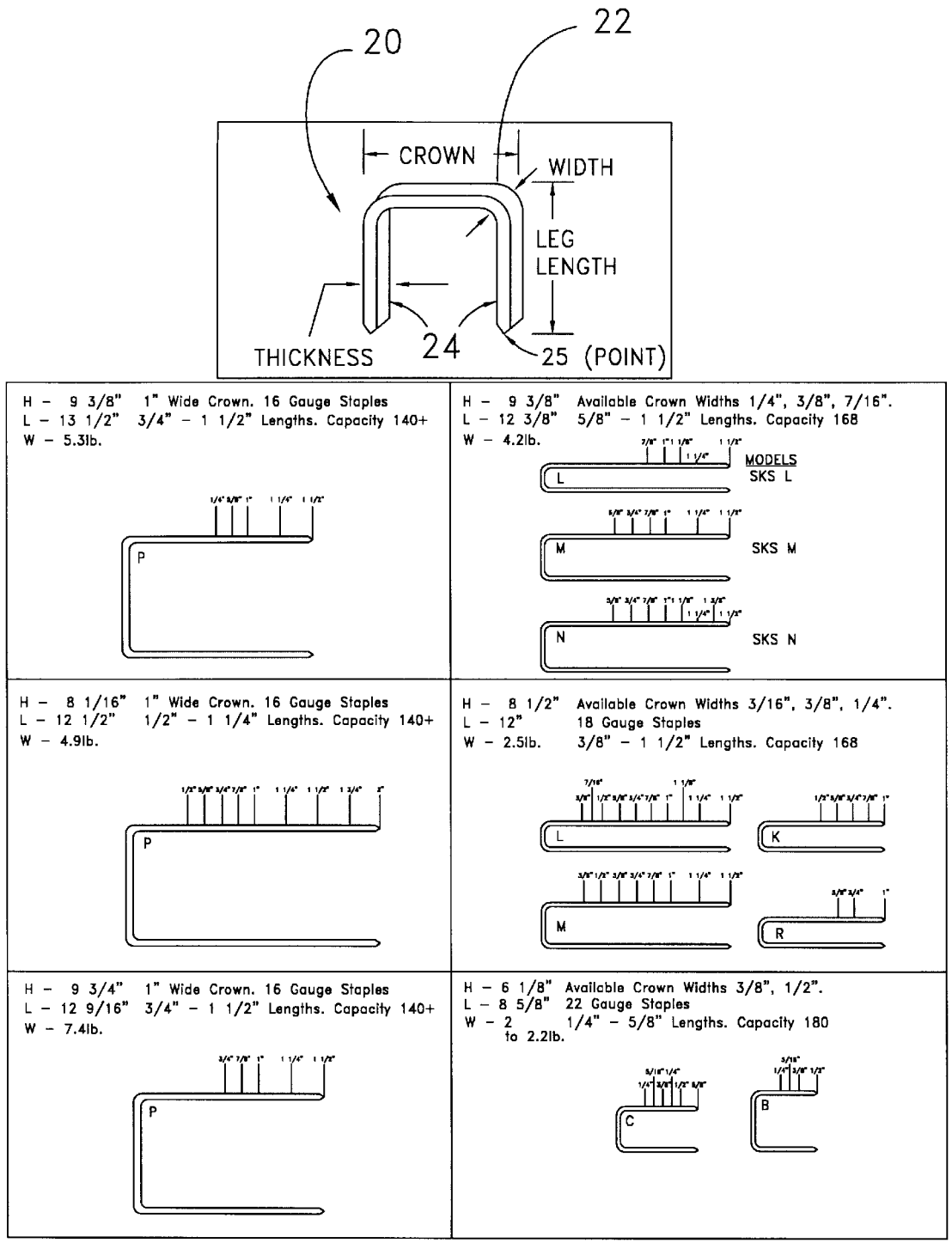
FIG. 2 shows a diagram of staple samples and a staple with color coding of the present invention.

For example, referring now to FIG. 2, there is shown a common staple 20 having a crown 22 and legs 24 (i.e. shafts) and points 25 as is used in the construction field. Staple 20 may have physical properties which vary, such as crown width, side width, leg length, gauge and thickness, as shown in FIG. 2. The preferred embodiment provides that colors be preselected to correspond to these and other properties, such as one color denoting one leg length and another color denoting a second different leg length, or different colors denoting different combinations of properties, such one color defining a first combination of length, width, and gauge and a second color defining a second combination of length, width and gauge which differs from the first. For example, for the different staples depicted in FIG. 2, each staple could be assigned a different color to define its combination of properties. The color coding is preferably applied to the crown portion of the appropriate staple, which is a portion of the staple which is exposed to view after the staple is installed. That is, when the legs and points are embedded into material, the crown is still visible. By color coding staples based on their specific properties or type, the properties of the staple fastener or type of staple fastener can be identified clearly before and after insertion.

Figure 3:
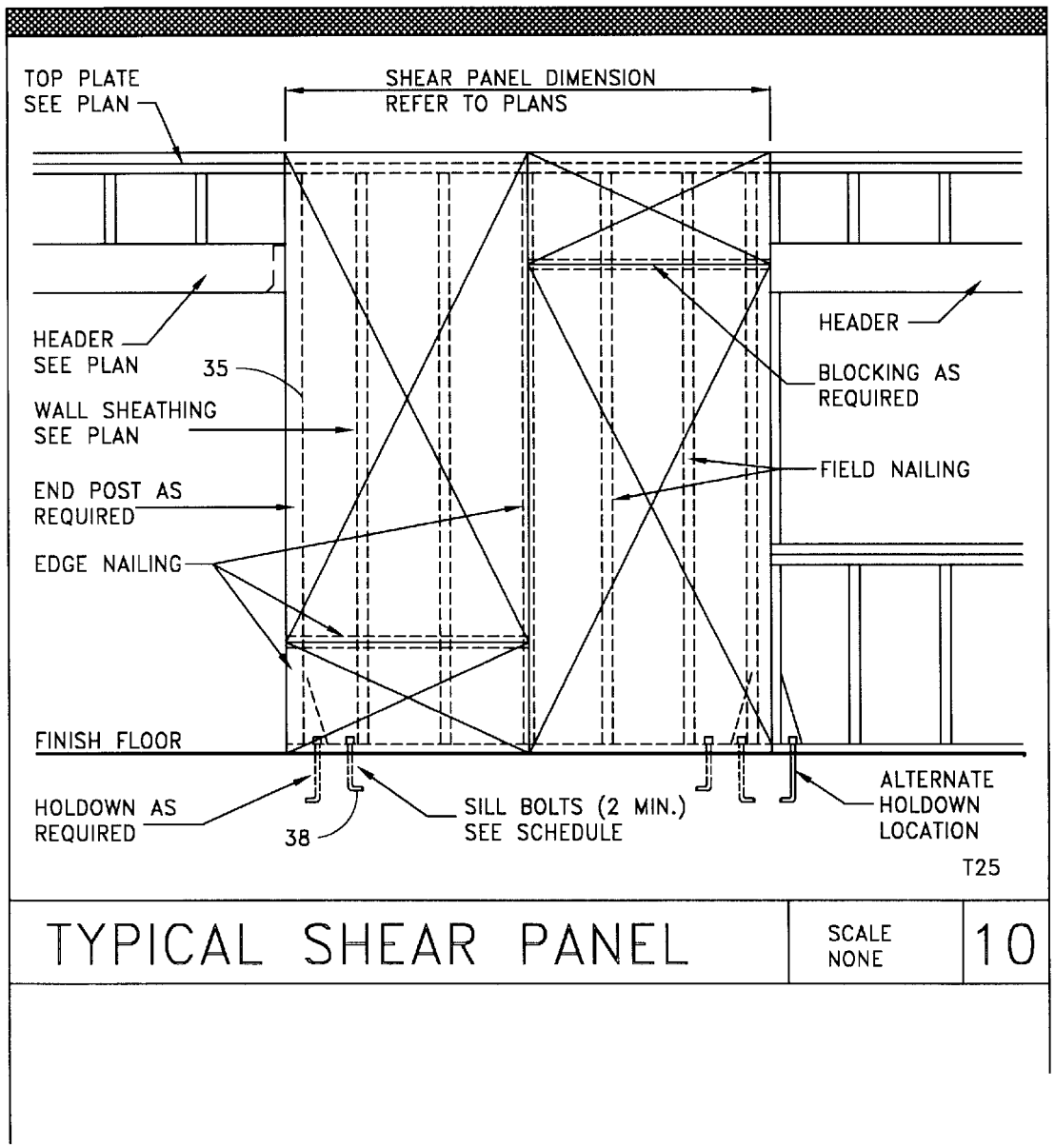
FIG. 3 shows a typical shear panel diagram featuring color coded fasteners of the present invention.

The shear panelled walls of a building are one of the most important components of a structure. This is where sheets of plywood or structural wafer wood panels are installed vertically on to certain wood framed walls as shown in FIG. 3. Different thicknesses of plywood, different spacklings, and different types of nails are used to achieve what engineers have calculated as required for a safe structure. One advantage of the present invention is that color coding of fasteners will result in the creation of colored patterns on structure components such as shear walls after the color coded fasteners have been installed. This will make identification of both the fasteners and their correct spacing and usage readily apparent.

For example, as shown below there is an excerpt of a common shear wall schedule following the Uniform Building Code:

| SHEAR WALL SCHEDULE PER 19 U.B.C. MARK | SILL NAILING | EXT. ANCHORAGE | INT. ANCHORAGE |
|---|---|---|---|
| ⅜" THK. WALL SHEATHING W/ 8d NAILS AT 6" O/C AT EDGES | 16d AT 5" O/C 16d AT 2.25" O/C | ½" A.B. AT 32" O/C ½" A.B. AT 16" O/C* | ½" A.B. AT 32" O/C ½" A.B. AT 16" O/C* |

A shear wall schedule indicates the fasteners that should be used for specific building applications as per the required Uniform Building Code. For this example, the number 5 is used, indicating that the shear schedule calls for the builder to use ⅜" thick wall sheeting with type 8d nails, at 6" on center at the edges. Further, the schedule calls for ½" anchor bolts at 32" on center, and ½" anchor bolts at 16" on center. For visual identification, using the present invention the 8d nails may be assigned the color code of blue, and the ½" anchor bolts the color code of red. Referring now to FIG. 3 which is a diagram of a typical shear panel wall, the dots 35 designated blue represent the 8d nails, 6" on center, and the dots 38 designated red represent the ½" anchor bolts at 32" on center and 16" on center. A pattern results with the red dots 38 and blue dots 35 which can be readily identified by construction worker and building inspector. By viewing this pattern and knowing the correlation between the exposed colors of the fasteners and their physical properties (from a color key chart), it can be easily determined if the correct fasteners have been used to mount the shear wall.

Furthermore, although the fasteners on the drawing have been illustrated, this representation expresses what pattern would be visible on the actual building when a color coding system was utilized. It would be clear as to what type of fastener was used and to whether the same type of fastener was used throughout and in accordance with specifications. Although the diagram in FIG. 3 is a specific representation of a shear wall application, this invention is applicable to all aspects of construction/building where fastener verification and identification is vital (for example, floor sheeting, roof sheeting, drywall installation, metal panels, framing, concrete to wood connections, wood to wood connections, and so on).

Figure 4:
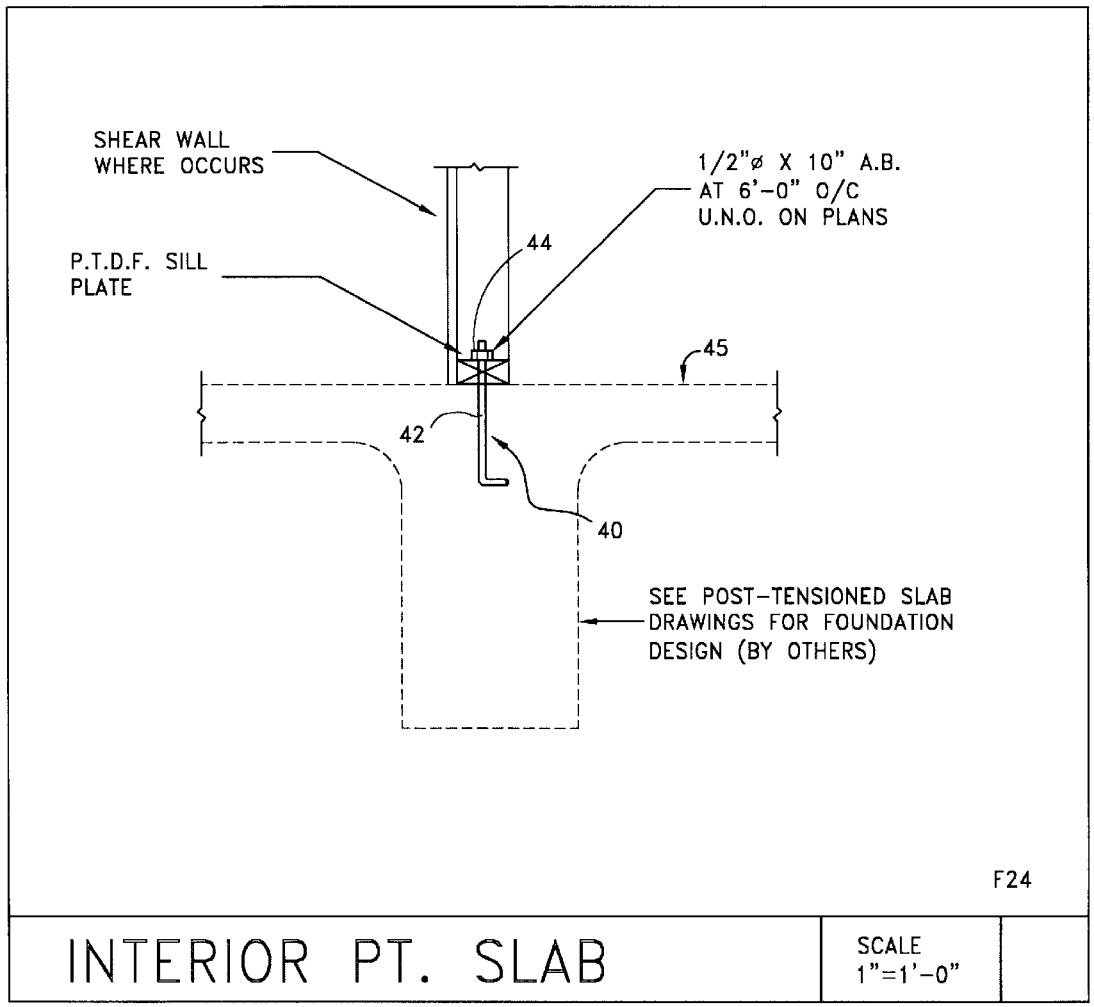
FIG. 4 shows a diagram of interior point slab with color coded anchor bolt.

As another example of the application of the present invention, FIG. 4 shows a drawing of a typical concrete to wood (slab to wall) detail showing an anchor bolt fastener 40. The anchor bolt fastener has an anchoring portion 42 which is embedded in concrete 45. The head 44 of the anchor bolt is exposed after application. Applying the principles of the present invention, the length of the anchor bolt anchoring portion 42 can be determined, after it is embedded in concrete, using the color coding system by assigning different colors to anchor bolts based on their properties, and applying the appropriate pre-selected color to exposed head 44 prior to use. For example, the diameter or length of the anchor bolt may be determined by assigning colors to these properties separately, or by assigning colors to the combination of length and diameter. As shown in FIG. 4, the color red has been pre-selected to define the combination of ½ inch diameter and 10 inches in length for an anchor bolt, and the red coloring has been applied to exposed portion 44. Other properties of the anchor bolt 40 may be similarly determined by using additional colors or symbols, as described above. The principles of the present invention are particularly beneficial in this context, because an anchor bolt cannot be removed or extracted once it has been installed. Color coding such fasteners would therefore be invaluable to installers and inspectors to ensure the correct size bolt was used for the respective application.

Figure 5A:
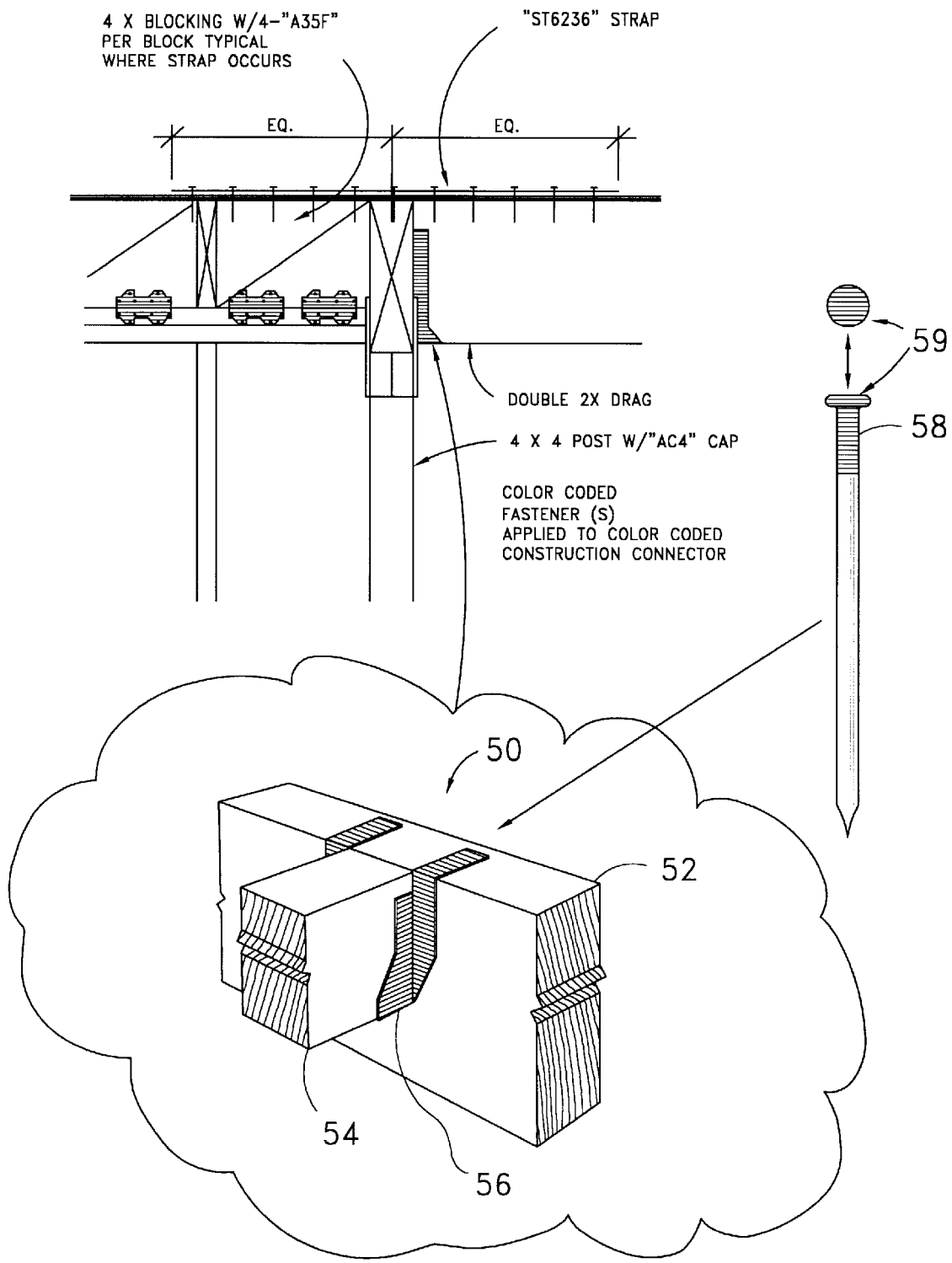
FIG. 5A shows a diagram of a construction connector (beam hanger) with color coding.

FIG. 5A represents a detail section of residential framing 50 in which two beams 52 and 54 meet one another perpendicularly. A beam hanger 56 is used as the construction connector in conjunction with fastener nails 58 which are inserted through openings in the beam hanger 56 and into beams 52 and 54. By color coding the beam hanger 56 in the same color code as the required nail fastener 58, one can verify, by sight, that the correct combination of beam hangers and fasteners was installed. Here, the beam hanger 56 could be colored over the entirety of its exposed surface, or only along portions of its surface. As described above, nail fastener 59 is colored at least upon its exposed portion 59 which corresponds to the head of the nail. In FIG. 5A, both are color designated dark blue. In other embodiments, it may be desirable that the construction connector be colored differently from the fasteners with which is must be used, to provide contrasting colors or other identifiers which might facilitate inspection. For example, the connector might be colored blue, to indicate that it must be used with red fasteners. As can be appreciated by those of skill in the art, there are numerous color combinations that might be used with this aspect of the present invention, as any particular color of the visible spectrum (and its neon and fluorescent equivalents) may be combined with other such colors.

Figure 5B:
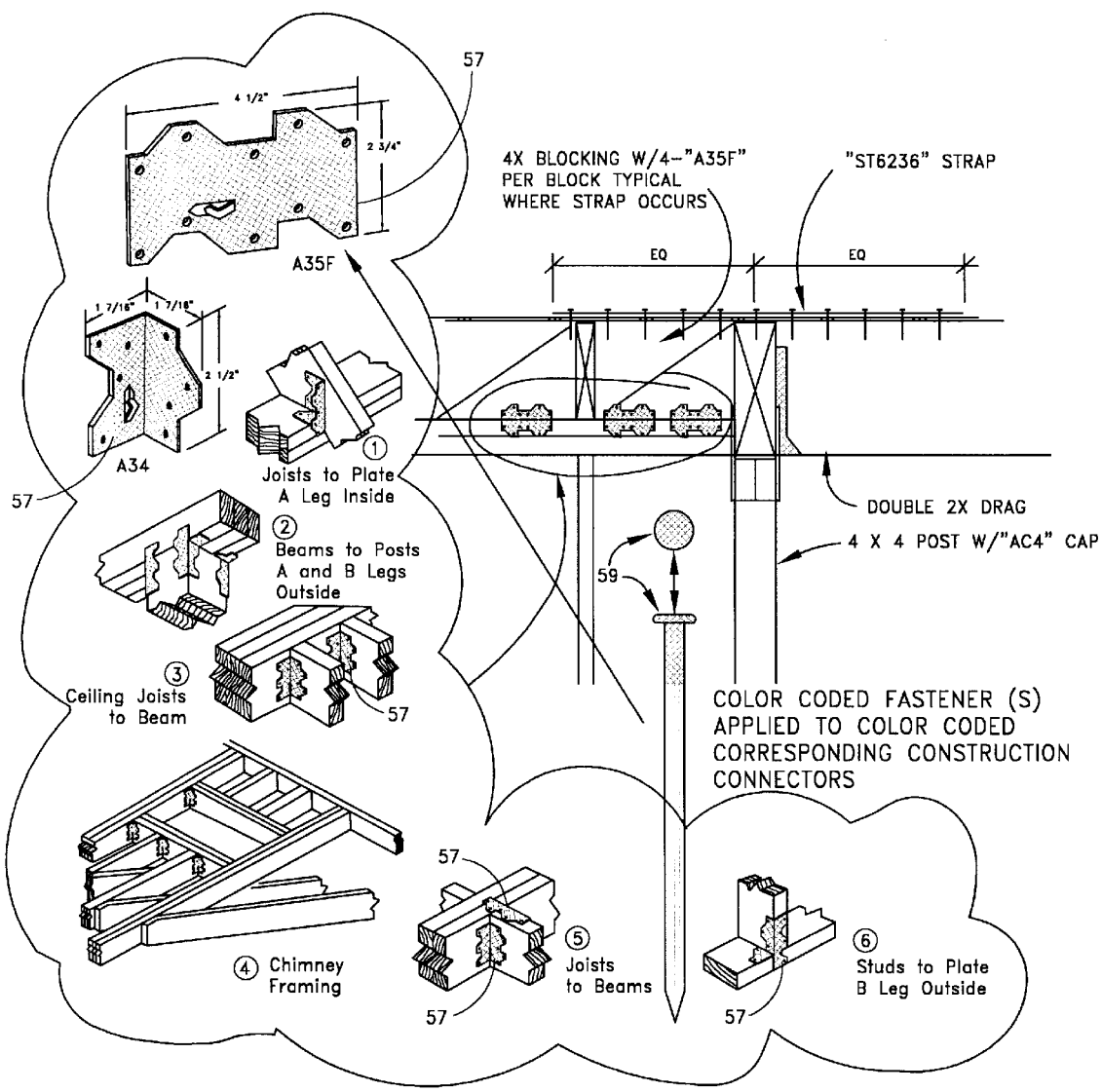
FIG. 5B shows a diagram of a construction connector (tie plates) with color coding.

FIG. 5B represents a detail section of residential framing in which construction connectors (tie plates) connect wood members. FIG. 5B shows several common types of tie plate applications, including joists to plate a leg inside, beams to posts A and B legs outside, ceiling joists to beam, chimney framing, joists to beams, and studs to plate B leg outside. By color coding the tie plates 57 in the same color (orange as shown in FIG. 5B) as the required nail fastener exposed portion 59 one can verify, by sight, that the correct application has been installed. Alternately, different colors can be used as described previously.

Figure 5C:
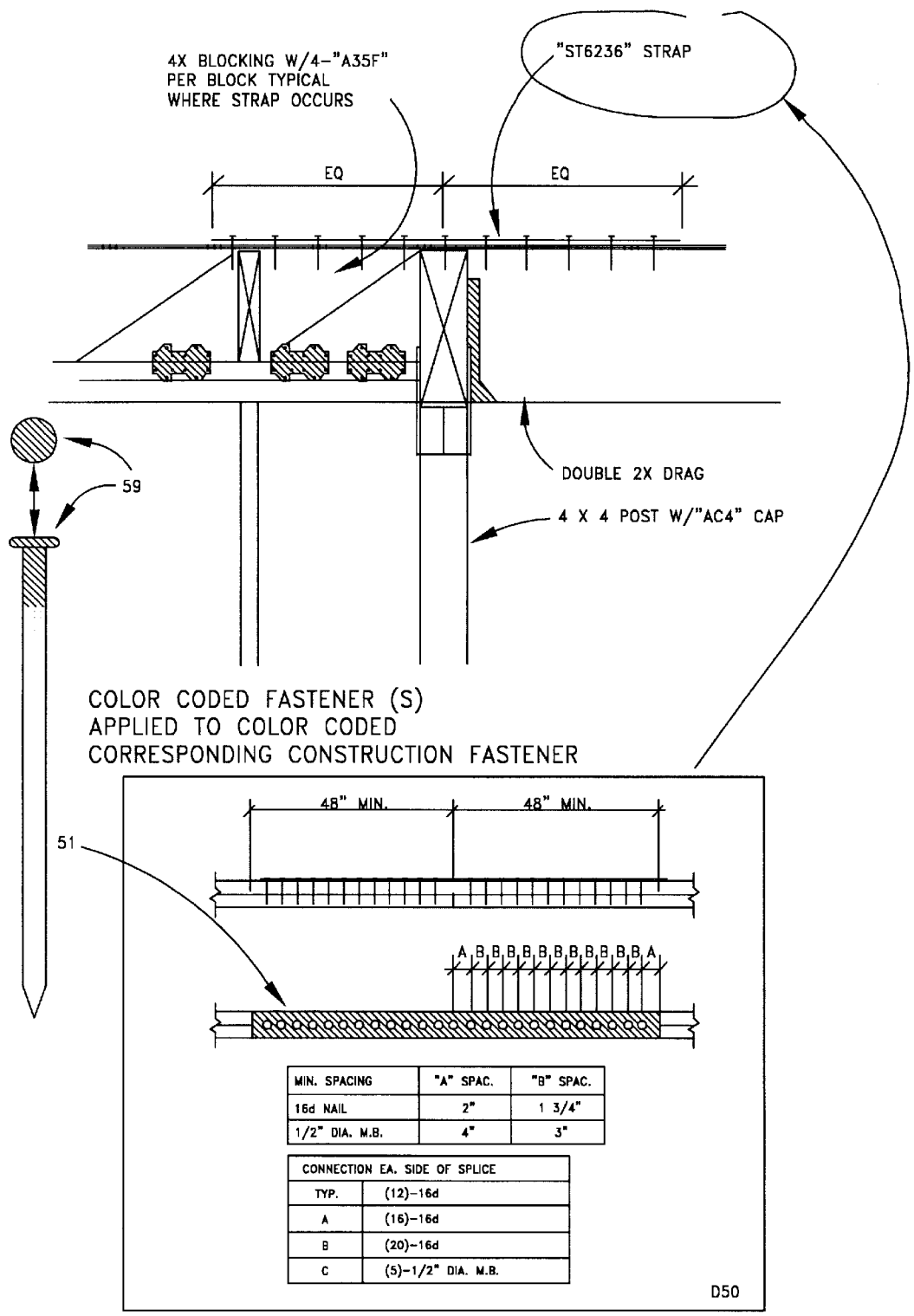
FIG. 5C shows a diagram of a construction connector (metal strap) with color coding.

FIG. 5C represents a detail section of residential framing in which construction connectors (metal straps) connect wood members. FIG. 5C shows a standard strap chart with nail schedule. By color coding the construction connector metal strap 51 in the same color (dark green as shown in FIG. 5C) as the required nail fastener exposed portion 59, one can verify, by sight, that the correct combination as set forth in the nail schedule has been installed.

Figure 5D:
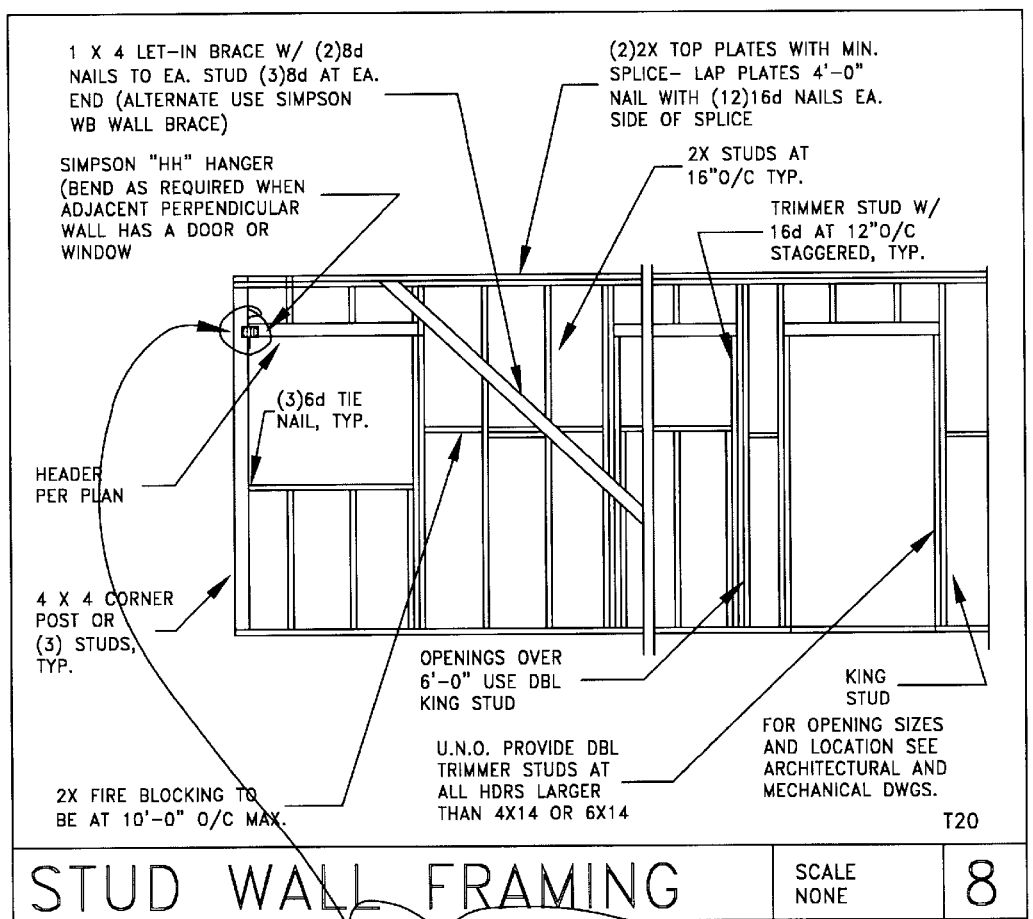
FIG. 5D shows a diagram of a construction connector (header hanger) with color coding.
Figure 5D:
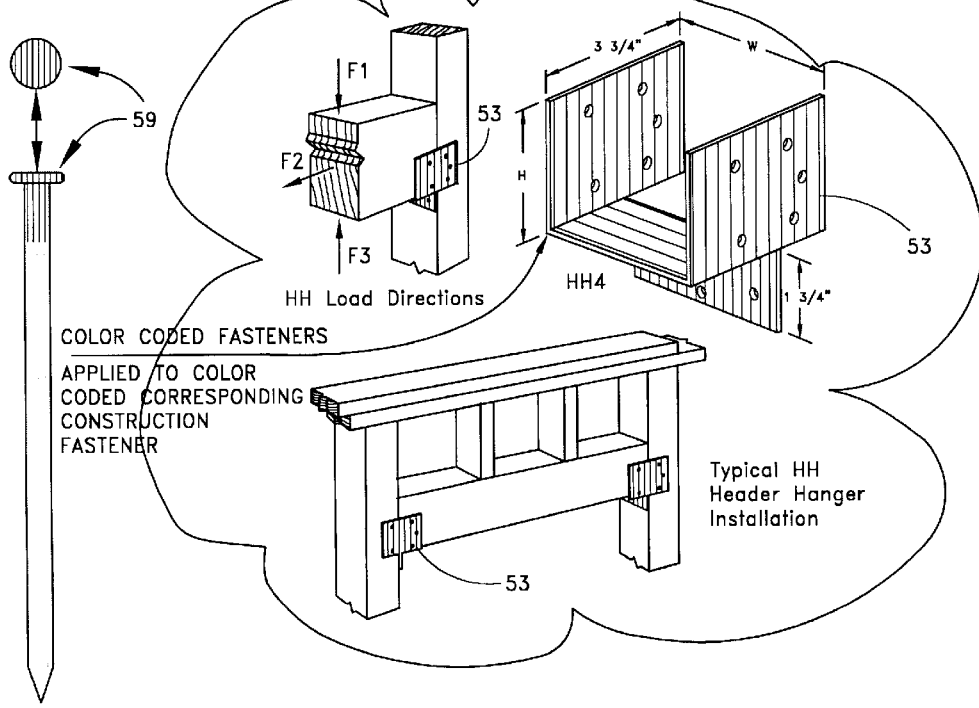

FIG. 5D represents a detail section of residential framing in which a construction connector header hangers 53 connects wood members. FIG. 5D shows a wall in which there is a window opening requiring this construction connector header hanger 53 application. By color coding the construction connector header hanger 53 in the same color code (red as shown in FIG. 5D) as the required fastener exposed portion 59, one can verify, by sight, that the correct combination has been installed. Also, it should be appreciated that although specific colors have been selected to designate the fasteners and connectors of FIGS. 5A–D, a variety of other colors may be pre-selected and still be used in the present invention.

The color imparted to the fasteners of the present invention to code them for identification may be applied in any manner known to those of skill in the art. In the preferred embodiment, the coloring will be applied by coating at least the exposed portion of the fastener with a colored substance, such as paint, resin or colored rubber compounds. Coating may be achieved by means well known to those of skill in the are, such as dip coating or spraying. It is preferred that the colored coating used is applied to that a sufficient amount should remain on the exposed portion of the fastener after the fastener has been applied such that the color on the exposed portion may be determined by a person viewing it. Preferably, the color of the exposed portion may be determined by a person of normal vision (20/20), obtained either with or without corrective lenses, at a distance of at least 1 foot away, more preferably from a distance of at least 5 feet away, and most preferably from a distance of at least 10 feet away, and optimally from a distance of at least 18 feet away. Moreover, in certain construction applications, it is desirable that the color of the exposed portion of the fastener be determinable from other distances, such as from at least 15 feet away, and sometimes from as far as 20 feet or greater. For example, it is not uncommon for vaulted ceilings on a medium-sized home to be from 20 to 30 feet in height. For these vaulted ceilings, it would be desirable to use fasteners of the present invention in which the color of the exposed portion may be determined from a distance of more than 20 feet, so that a building inspector standing below could determine the color of the exposed portion and thus that the correct fastener has been used.

It is also preferred that the coloring agent used to practice the present invention be of the type that is not removed when the fastener is inserted by a driving member, such as the hammering of a nail. It is most preferred that enough of the coloring remain after the fastener has been inserted so that the color of the exposed portion of the fastener may be determined by person of normal vision from at least 5 feet away, preferably 10 feet away, more preferably 15 to 18 feet away, and optimally from 20 feet away or more, even when used on fasteners having exposed surfaces as small as an 8 gauge nail head, and preferably as small as a 12 ½ gauge nail head. The present inventors have determined that colored rubber based compounds, such as Plastic Dip sold by Plastic Dip International, Circle Pines, Minn., are suitable coloring agents for this purpose.

Although the foregoing description of the preferred embodiments of the present invention has shown, described and pointed out the fundamental novel features of the invention, it will be understood that various omissions, substitutions, and changes in the form of the detail of the apparatus and method as illustrated as well as the uses thereof, may be made by those skilled in the art, without departing from the spirit of the present invention. Consequently, the scope of the present invention should not be limited to the foregoing discussions, but should be defined by the appended claims.

What is claimed is:

1. A nail, comprising:

a shaft having a first end and a second end;

a head attached to the first end of the shaft; and an identifying color covering the exposed upper surface of the head, the identifying color pre-selected to correspond to a specified length and gauge of the nail, the identifying color being applied in sufficient quantity so that it may be recognized by a person of normal vision from a distance of at least 10 feet after the shaft has been fully inserted into a surface and only the exposed upper surface of the head is visible.

2. The nail of claim 1, wherein the color is capable of being recognized from a distance of 15 feet.

3. The nail of claim 2, wherein the color is capable of being recognized from a distance of at least 18 feet.

4. A nail, comprising:

a shaft having a first end and a second end;

a head attached to the first end of the shaft; and an identifying color covering the exposed upper surface of the head, the identifying color pre-selected to correspond to one of a plurality of colors on a color code key, where each color of the plurality indicates a specific shaft length and gauge, the identifying color being applied in sufficient quantity so that it may be recognized by a person of normal vision from a distance of at least 5 feet after the shaft has been fully inserted into a surface and only the exposed upper surface of the head is visible.

5. The nail of claim 4, wherein the identifying color comprises a paint.

6. The nail of claim 4, wherein the identifying color comprises a rubber based compound.

7. The nail of claim 4, wherein the identifying color remains visible after the nail is hammered into the surface.

8. The nail of claim 4, where the identifying color is a neon color.

9. The nail of claim 4, where the identifying color is a fluorescent color.

10. The nail of claim 4, wherein the color is capable of being recognized from a distance of 15 feet.

11. A method of identifying the length and gauge of a nail after the shaft of the nail has been inserted into a surface, comprising:

providing a nail with a shaft having a first end and a second end, a head attached to the first end of the shaft, and an identifying color covering the exposed upper surface of the head, the identifying color pre-selected to correspond to a color code key indicating a specified length and gauge of the nail, the identifying color being applied in sufficient quantity so that it may be recognized by a person of normal vision from a distance of at least 5 feet after the shaft has been fully inserted into a surface and only the exposed upper surface of the head is visible;

inserting the nail shaft into a surface so that only the exposed upper surface of the head is visible;

providing the color code key with a plurality of colors, where each color corresponds to a different specific combined nail gauge and length; and correlating the color on the color code key to the identifying color on the exposed upper surface of a nail to determine the length and gauge of the nail.

* * * * *